Aug. 20, 1957     P. E. RENOUX     2,803,226
CONTROLLING MECHANISM FOR THE TOOLHOLDER OF A MACHINE-TOOL
Filed May 7, 1954     9 Sheets-Sheet 1
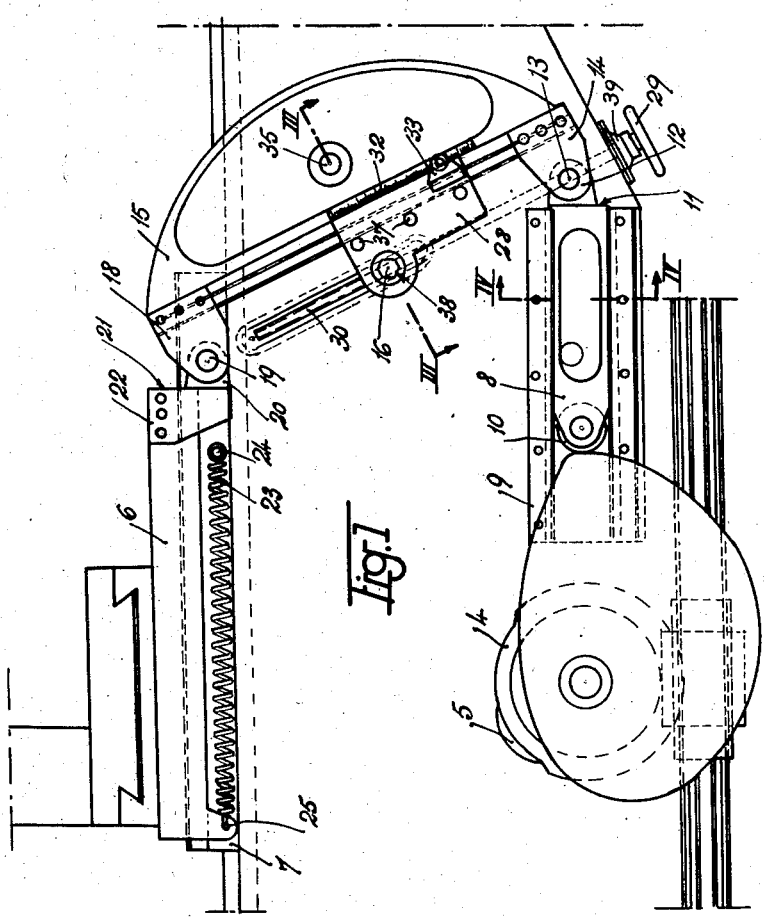

Aug. 20, 1957    P. E. RENOUX    2,803,226
CONTROLLING MECHANISM FOR THE TOOLHOLDER OF A MACHINE-TOOL
Filed May 7, 1954    9 Sheets-Sheet 2
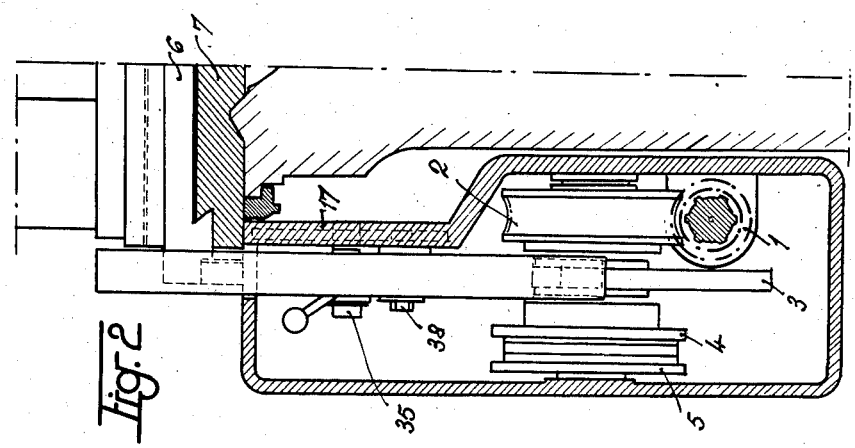
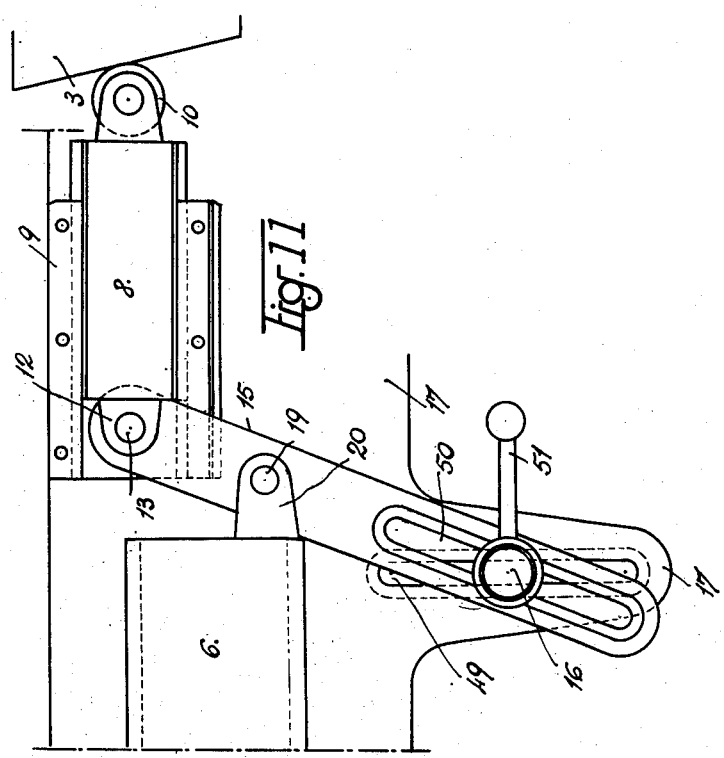

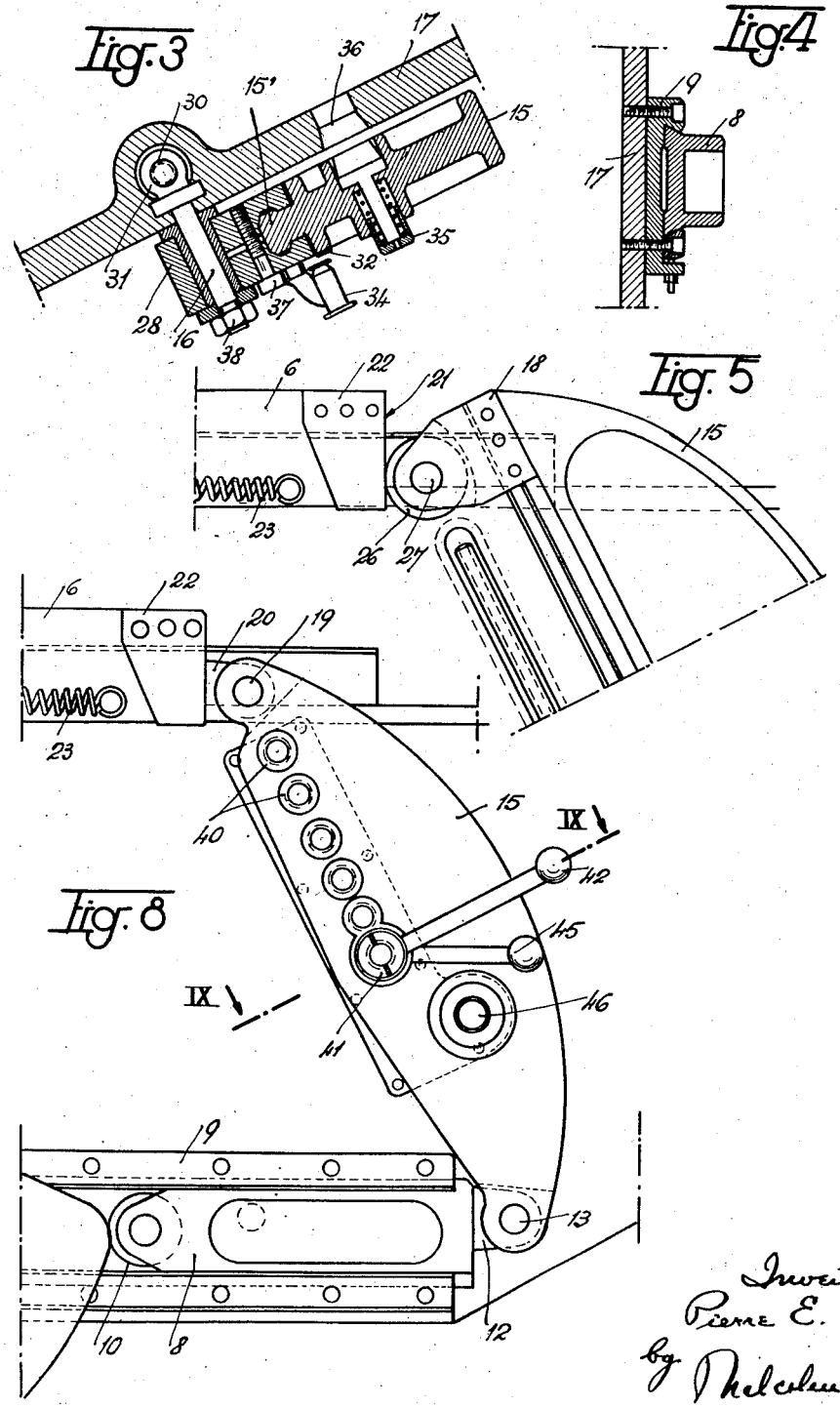

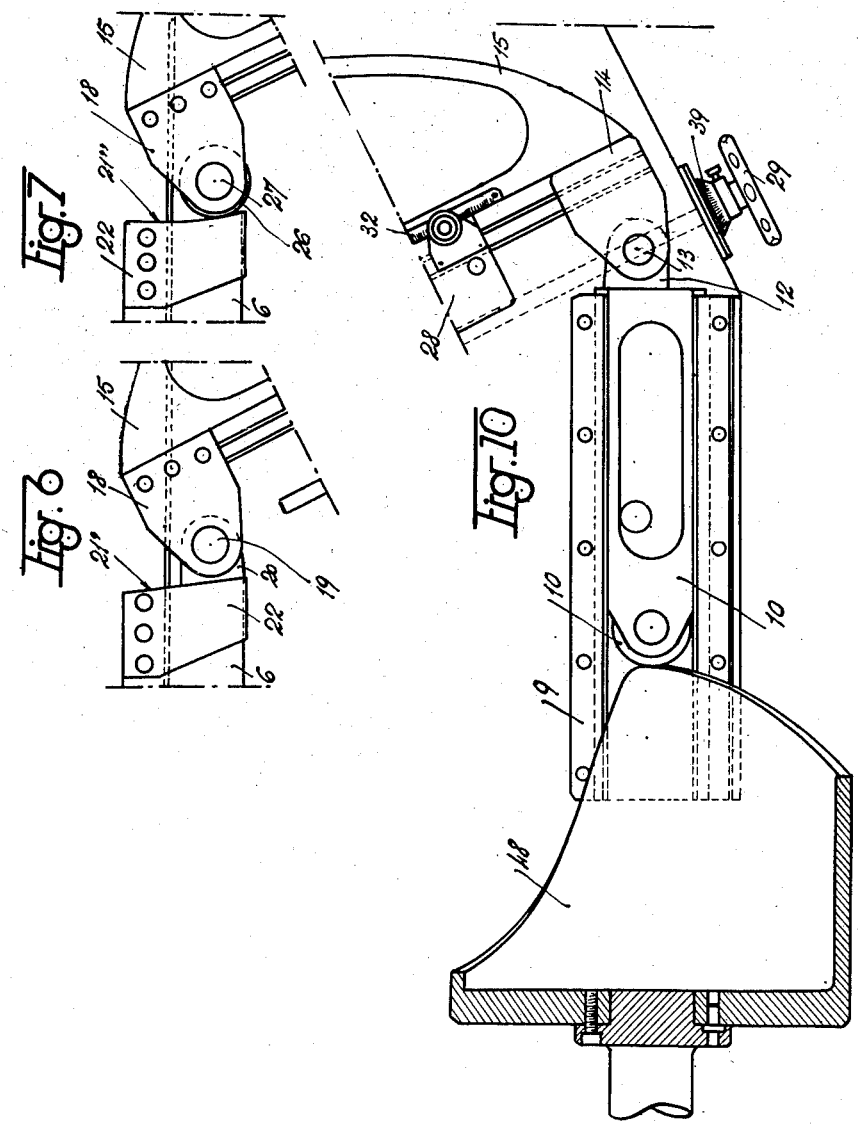

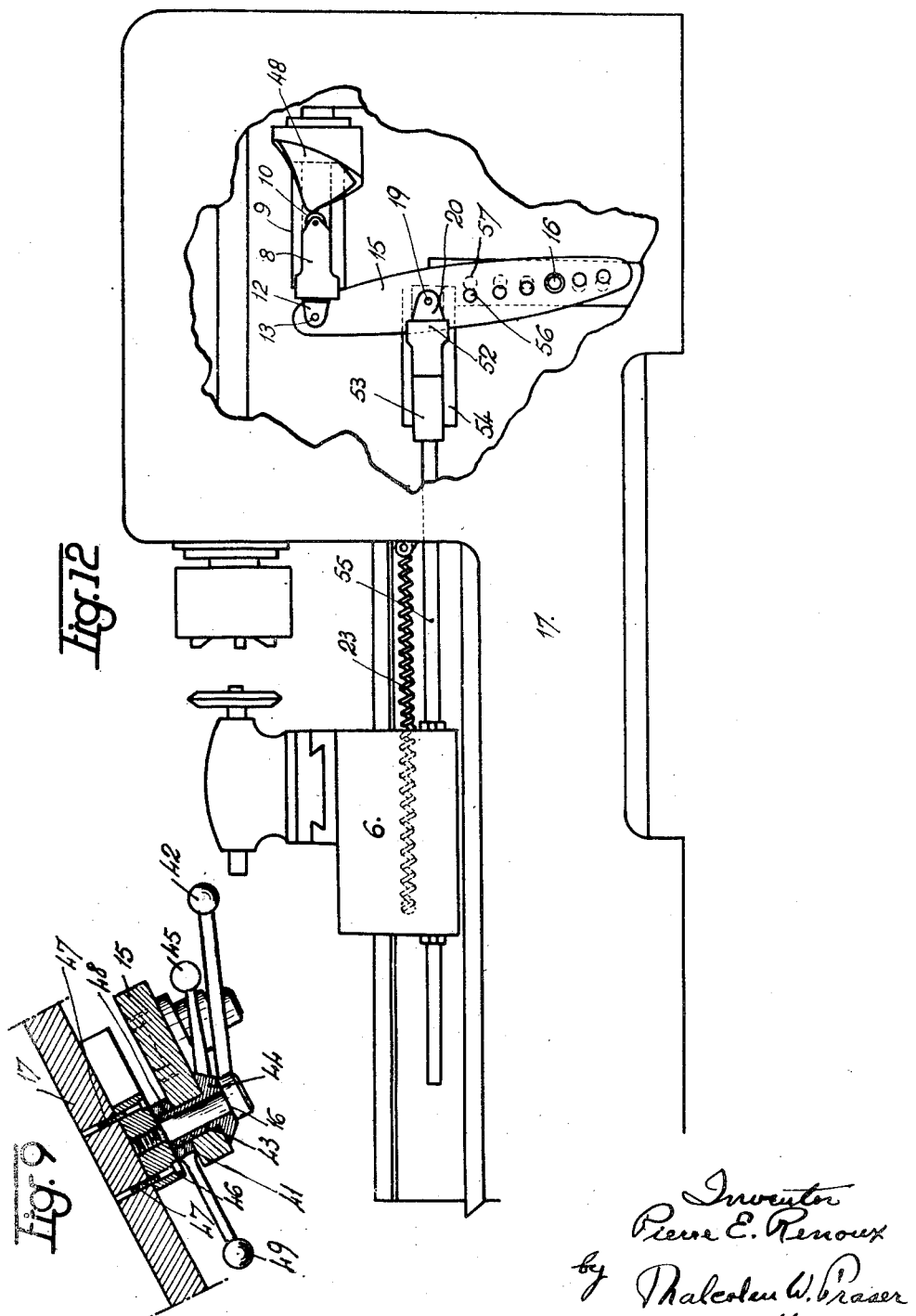

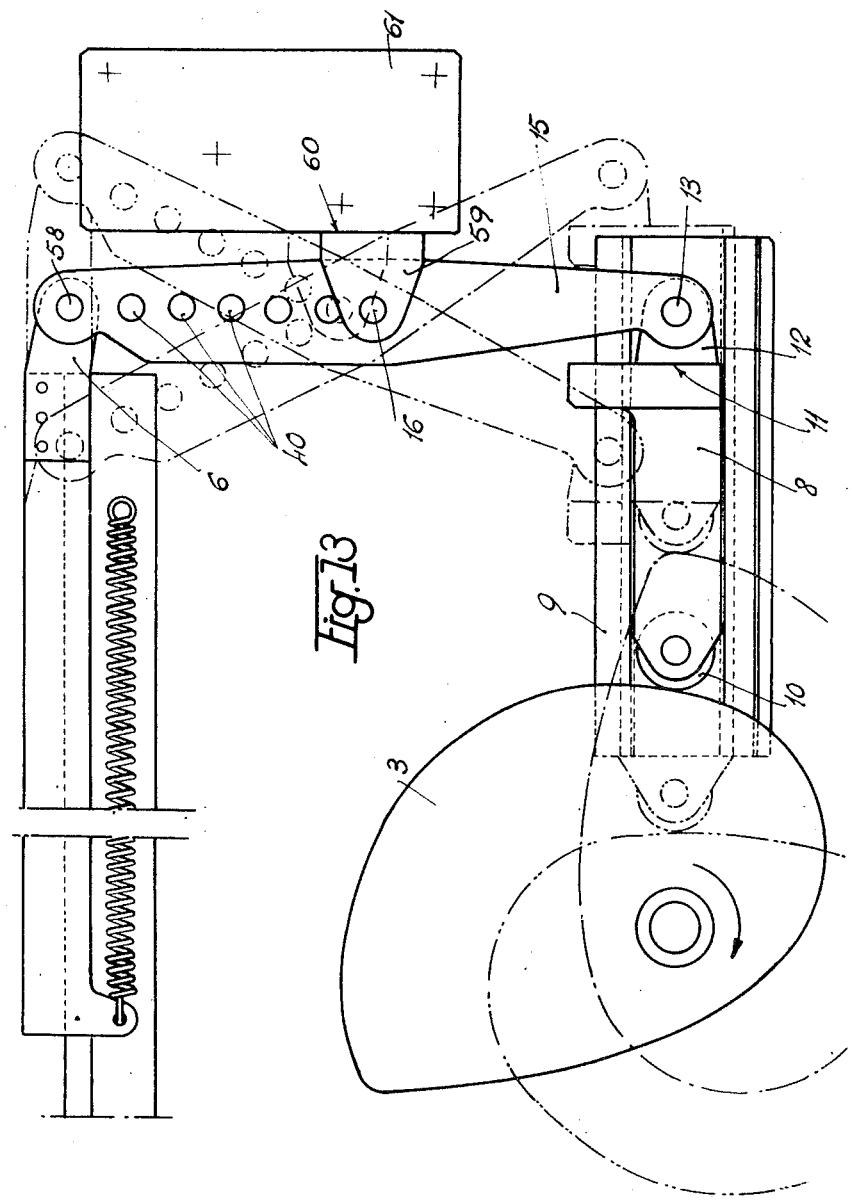

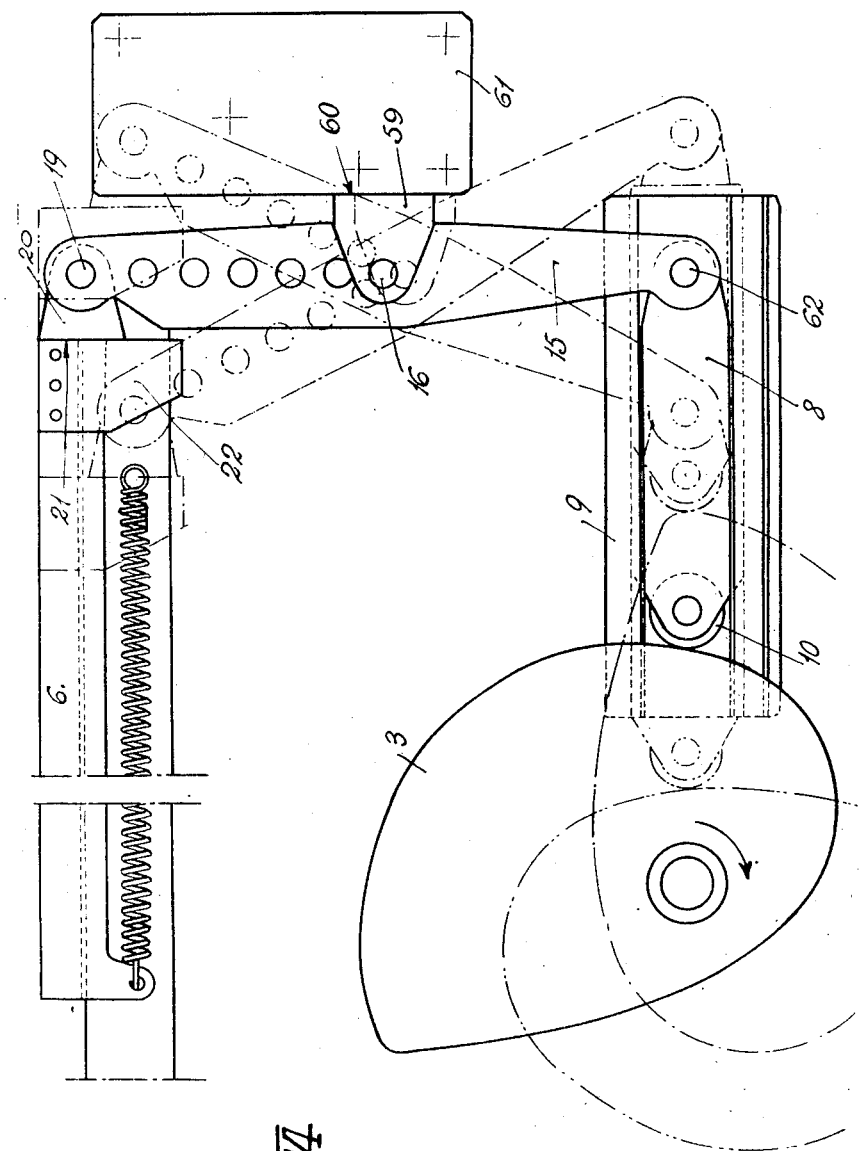

Aug. 20, 1957 P. E. RENOUX 2,803,226
CONTROLLING MECHANISM FOR THE TOOLHOLDER OF A MACHINE-TOOL
Filed May 7, 1954 9 Sheets-Sheet 9

Inventor
Pierre E. Renoux
by Malcolm W. Fraser
attorney

United States Patent Office 2,803,226
Patented Aug. 20, 1957

2,803,226

CONTROLLING MECHANISM FOR THE TOOL-HOLDER OF A MACHINE-TOOL

Pierre Edouard Renoux, Argenteuil, France, assignor to Societe Anonyme dite: Cri-Dan, Paris, France, a French company Application May 7, 1954, Serial No. 428,200

Claims priority, application France May 22, 1953

16 Claims. (Cl. 121—147)

It has been already proposed to control the movement of the carrying member termed hereinafter the "tool-carrying slide" or tool-holder, of a machine-tool operating through the removal of material by a cutting tool or a grinding wheel, through the agency of a cam assuming a continuous rotary movement and against which is urged a contacting member which is operatively connected with the tool-carrying slide through any suitable transmission means.

The present invention has for its object an improved mechanism for controlling the movements of the tool-holder in a machine-tool and more particularly in a thread-cutting machine in which the movements of said tool-carrying member or slide or, more briefly, the tool-holder are obtained by means of such a conventional cam assuming a continuous rotary movement and against which a guided contacting member operatively connected with the tool holder through a suitable transmission is adapted to bear.

According to the invention, a slide adapted to assume a rectilinear movement and urged against said cam with the interposition of a roller, acts on a rocking lever the position of the pivotal axis of which is adjustable, said rocking lever transmitting to the tool-holder, as the cam rotates, the movements transmitted by the slider to the rocking lever with a predetermined ratio between the movement of the slider and that of the tool-holder. To this end, the rocking lever bears against two members of which at least one is rigid with one of said elements, the slider and the tool-holder, through the agency of pivotal contacting parts provided with pivotal connections, said corresponding parts and members engaging each other slidably along cooperating surfaces, the line connecting the pivots of said contacting parts passing through the adjustable pivotal axis of the rocking lever and, as the case may be, through the point at which said rocking lever is pivotally secured to the other of the above mentioned elements.

The rocking lever may engage either the slider and a member rigid with the tool holder or else, the slider and an intermediate part to which the rocking lever is adjustably and pivotally secured inwardly of the point at which it is pivotally secured to the tool holder or again the tool holder and an intermediate part to which said rocking lever is adjustably and pivotally secured inwardly of the point at which it is pivotally secured to the slider.

The rocking lever may engage the two above mentioned surfaces through the agency of a shoe or of a roller which is pivotally secured to or carried by the said rocking lever.

The above referred-to movement ratio may remain perfectly constant, whatever be the corresponding positions of the slider and of the tool-holder along the paths followed by each of them; the shifting of the tool holder is thus always proportional to the rotation of the cam at all points of its movement and whatever may be the transmission ratio selected.

According to the invention, this requires parallelism between the surfaces against which the rocking lever bears through the agency of the pivotal contacting parts.

Now, if, according to the invention, it is desired, during the movement of the tool holder, to bring a correction of a sinusoidal type to this movement with reference to the movement of the slider, it is possible to give either or both contacting surfaces referred to hereinabove a more or less marked relative obliquity.

More intricate corrections may also be obtained according to our invention, by giving either or both of said contacting surfaces a curvilinear shape.

It is important to provide an accuracy as perfect as possible for the movement of the tool holder, which should remain perfectly proportional to the angular shifting of the cam at all points of its movement, and whatever may be the selected transmission ratio, the possible corrections to be brought to the movements, if required, being taken into account.

An essential condition to be observed for obtaining said accuracy consists in that the three pivotal axes of the rocking lever and of the two contacting members associated therewith, should be in perfectly accurate alignment.

Furthermore, the location of the adjustable pivotal axis of the rocking lever should be defined with the utmost accuracy.

This pivotal axis may be carried by a member sliding over the rocking lever and provided with a mark moving in front of a scale formed on the latter; it may also be secured selectively in one of the perforations formed along the length of the rocking lever so as to obtain, in any case, the desired ratio of transmission.

This pivotal axis may be located outside the segment of a rectilinear line connecting the pivotal connections between the two contacting parts and the rocking lever so as to allow resorting to longer lever arms and obtaining thereby a still higher accuracy. In a further embodiment, the rocking lever is adapted to act on a guided member which controls at a predetermined distance the tool holder.

It is also possible to associate with said mechanism an auxiliary hydraulic control system for the longitudinal movements of the tool holder; the end of the rocking lever may then control, without any substantial energy being applied thereto, the rod of a slide valve forming a pilot valve for a hydraulic jack controlling said longitudinal movements.

It is possible to increase the sensitivity of the control of the location of the jack with reference to that of the end of the rocking lever by amplifying the shift between the tool holder and the end of the rocking lever through the agency e. g. of a lever pivotally secured to the body of the jack, carrying the pivotal means associated with the end of the rocking lever and acting through its free end on the rod of the slide valve.

Mechanisms for controlling the movements of the tool holder in a machine-tool are already known. But in such prior mechanisms, the rocking lever is generally connected with the tool holder through an adjustable pivotally secured link which leads to kinematic errors which the present invention has precisely for its object to remove; furthermore, the modification in the transmission ratio in such prior arrangements is not obtained through a shifting of the pivotal axis of the rocking lever but through a shifting of the point on which the driving action is exerted. In other cases, the rocking lever engages directly the driving cam with the interposition of a roller instead of a slider designed in accordance with the present invention. Again, no rocking lever provided with an adjustable pivotal connection or an intermediate slider between the rocking lever and a driving cam has been proposed hitherto.

Further features of the invention will appear in the reading of the following description of various embodiments disclosed by way of example and by no means in a limiting sense, reference being made to accompanying drawings wherein:

Fig. 1 is an elevational view of the mechanism controlling the longitudinal slide of a thread-cutting machine;

Fig. 2 is an elevational, partly sectional view thereof in a plane perpendicular to that of Fig. 1;

Figs. 3 and 4 are sectional views through lines III—III and IV—IV of Fig. 1;

Fig. 5 is a partial view of a modification of the machine illustrated in Fig. 1;

Fig. 6 and 7 are partial views of modifications of Fig. 1 wherein corrections of a sinusoidal or of a more intricate shape are introduced;

Fig. 8 is an elevational view of a further embodiment of the mechanism controlling the longitudinal slide of a thread cutting machine;

Fig. 9 is a sectional view through line IX—IX of Fig. 8;

Fig. 10 is a partial elevational view of the mechanism illustrated in Fig. 1 provided with a bell-shaped cam;

Fig. 11 is an elevational view of a control mechanism of a thread-cutting machine, wherein the pivotal axis of the lever is shifted beyond the straight line section connecting with each other the pivotal axes of the two contacting pieces.

Fig. 12 is an elevational view of a control mechanism of a thread cutting machine, for the remote control of the tool holder through the rocking lever;

Fig. 13 is an elevational view of a further modification;

Fig. 14 is an elevational view of a still further modification;

Figure 15:
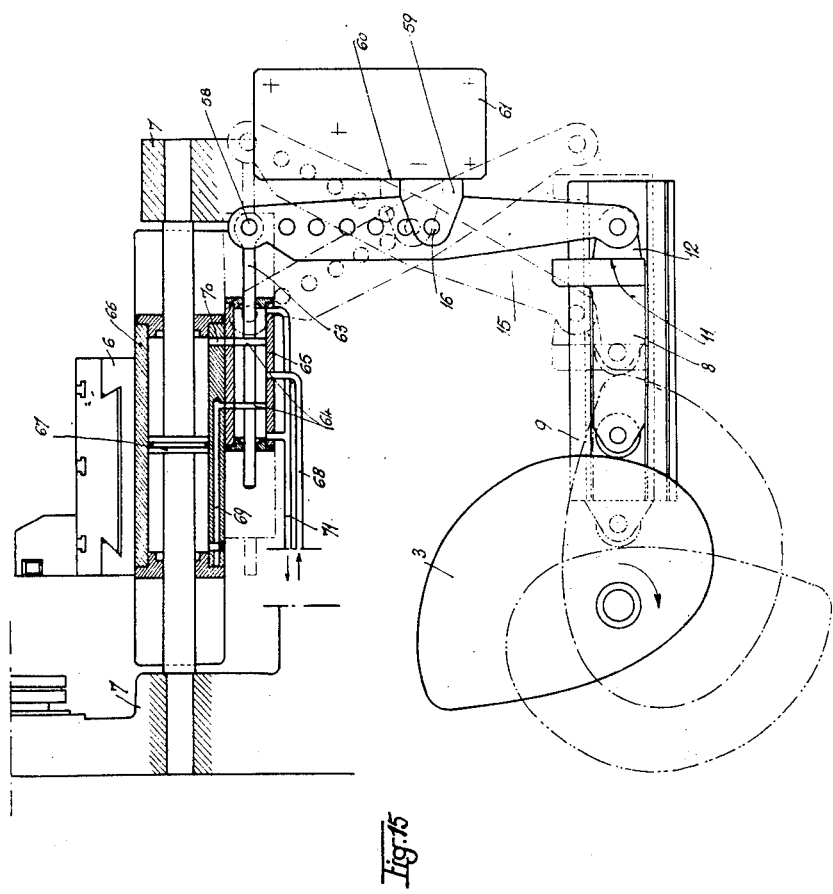
Fig. 15 is an elevational partly sectional view of the embodiment illustrated in Fig. 13 associated with an auxiliary hydraulic control for the tool holder carrier slide.

In Figs. 1 and 2, are illustrated the conventional parts controlling the longitudinal movements of the tool holder in a thread cutting machine, to wit: the worm 1 the rotation of which is controlled by any suitable power unit, and which drives in its turn the worm-wheel 2 rigid with the cam 3 and also the cams 4 and 5 controlling respectively the receding and leading movements of the tool.

The cam 3 which controls the longitudinal movements of the tool holder 6 over the saddle 7 of the thread-cutting machine, constrains, as it rotates, a slider 8 (Fig. 1) to execute a forward movement corresponding to the active peripheral section of the cam and a receding movement corresponding to the inoperative peripheral section of the cam, said movements of the slider being guided inside the slideway 9. The slider 8 carries at one end a roller 10 engaging the cam 3.

The other end of the slider 8 is provided with a bearing surface 11, engaged by a shoe 12 pivotally carried at 13 inside a bearing 14 formed in a rocking lever 15 pivotally secured at 16 to the frame 17 of the machine. The other end of the rocking lever 15 carries a further bearing 18 in which is pivotally carried at 19 a shoe 20 bearing against the bearing surface 21 of a member 22 rigid with the tool holder 6.

The longitudinal movements of the slider 8 produce a rocking movement of the rocking lever 15 around its pivotal axis 16 and are transmitted by said rocking lever to the tool holder 6, the ratio between said longitudinal movements of the slider and of the tool holder depending on the location of the axis 16 of the rocking lever with reference to the pivotal axes 13 and 19 of the shoes or contacting members 12 and 20.

The return spring 23 for the tool holder 6 is connected on one hand at 24 with the saddle 7 and on the other hand at 25 with the tool holder 6 so as to provide for the permanent contacting between the cam 3 and the roller 10, between the slider 8 and the shoe 12 and between the shoe 20 and the member 22.

These permanent contacts instead of being ensured by a spring may be ensured by a hydraulic repositioning system including e. g. a jack operated by a fluid under pressure or by any other return means.

In order to obtain movements of the tool holder 6 which are exactly proportional to the rotation of the cam whatever may be the selected ratio for the transmission and whatever may be the point at which these movements are considered, it is necessary:

(a) for the outline of the cam to be such that it imparts to the slider 8 movements that are proportional to the angle of rotation of said cam;

(b) for the pivotal points 19, 16, 13 to be in accurate alignment;

(c) for the bearing surfaces 21 and 11 of the member 22 rigid with the tool holder 6 and of the slider 8 respectively, to be parallel.

Furthermore, the value of the ratio between the movements should be exactly defined, which requires an accurate adjustment of the pivotal axis 16 with reference to the axes 19 and 13. Such an accurate positioning of the pivotal axis 16 may be obtained by means disclosed hereinafter.

The contacting shoe 20 between the rocking lever 15 and the member 22 rigid with the tool-holder 6 may be replaced as shown in Fig. 5 by a roller 26 revolubly carried at 27 on the terminal bearing member 18 rigid with the rocking lever 15.

The same modification may be brought to the shoe 12, which may be replaced similarly by a roller.

The bearing surface 21 of the member 22 rigid with the tool holder 6 may be arranged obliquely as shown at 21' in Fig. 6 and may even assume a curvilinear shape as shown at 21'' in Fig. 7 according as to whether corrections of a sinusoidal or of a more intricate shape are to be made. Similarly, the bearing surface 11 on the slider 8 may be oblique or curvilinear. In this latter case, it is preferable to resort to contacting rollers instead of shoes. Corrections of the type referred to may be necessary with a view to compensating for intsance for the deformations which may arise in the work which is to be machined when the latter is submitted to heat treatment.

The pivotal axis 16 of the rocking lever 15 is carried as shown in Figs. 1 and 3 by a slider 28 made of two parts adapted to slide as required along said rocking lever 15, said parts being fitted over a lateral projection 15' of the latter. The sliding of said slider 28 is controlled by a handwheel 29 which provides for the rotation of a screw 30 perpendicular to the axis 16 and fitted inside a recess of the body 17 of the machine and engaging a nut shaped member 31 which is held against rotation, said member 31 being rigid with the spindle 16. A scale-carrying ruler 32 is secured to the rocking lever 15 and the slider 28 carries a pointer 33 adapted to move in register with the scale on said rule. A microscope 34 provides for an easy reading of the scale (Fig. 3).

In order to adjust the ratio between the movements of the tool holder and of the slider 8, the knob 35 carried by the rocking lever 15 is first depressed so as to engage a corresponding housing 36 in the stationary frame 17 and to hold the rocking lever fast (Fig. 3). The three screws 37 securing the slider 28 to the rocking lever 15 are then released and the nut 38 holding the rocking lever rigidly on its pivot 16 is also released. The hand wheel 29 is then actuated so as to bring the pointer 33 in register with the desired subdivision of the scale 32. A vernier 39 and the microscope 34 serve for perfecting the adjustment of the pointer with reference to the desired subdivision of the scale. The screws 37 and the nut 38 are then screwed home and the knob 35 is released. The mechanism is now ready for operation i. e. for the cutting of the thread at the desired pitch; when it is desired to correct the pitch of the thread, it is sufficient to make the handwheel 29 turn either towards the right so as to lengthen the pitch or towards the left so as to shorten it.

In the modification illustrated in Figs. 8 and 9, the rocking lever 15 is provided on the straight line connecting the terminal pivotal axes 19 and 13 for the shoes 20 and 12 with a number of perforations 40 the location of each of which corresponds to a selected value of the transmission ratio. The pivotal spindle 16 of the rocking lever 15 is constituted by a screw 41 rigid with a control lever 42 and engaging an eccentric sleeve 43 provided with a vernier 44 and with a control lever 45.

To adjust the transmission ratio in accordance with the pitch of the thread to be cut, the know 46 (Fig. 8) carried by the rocking lever is first depressed whereby, upon engagement of said knob inside a corresponding recess in the frame 17 of the machine, said rocking lever is held fast. This being done, the screw 41 carrying the lever 42 and the eccentric sleeve 43 with the vernier 44, are removed and positioned inside that opening 40 in the rocking lever which corresponds to the pitch of the thread to be cut. The screw 41 is then screwed into the corresponding opening of a part 46' rigid with the body 17 of the machine as provided by the screw 47 and the screw 41 is urged home by means of its controlling lever 42. The mechanism is now ready for operation and allows cutting the thread at the desired pitch. When the pitch is to be corrected, it is sufficient to reelase the nut 48 through action on the lever 49 while the vernier-carrying eccentric sleeve 43 is angularly shifted through corresponding lever 45, either upwardly in order to lengthen the pitch or downwardly for shortening it.

In the modification illustrated in Fig. 10, the flat cam 3 has been replaced by a bell-shaped cam 48 in contact with the roller 10 revolubly carried by the slider 8.

In the modification illustrated in Fig. 11, the pivotal spindle 16 of the rocking lever 15 is shifted beyond the straight line section connecting with each other the pivotal axes 19 and 13 for the shoes 20 and 12.

The location of said spindle 16 is adjusted through its sliding longitudinally of the slots 49 and 50 provided respectively in the stationary frame 17 and in the locking lever 15 while 51 designates the lever controlling and locking said pivotal spindle 16.

In the further modification illustrated in Fig. 12, 48 designates the bell-shape control cam, 8 the slider engaging the latter through the agency of its roller 10 while 12 designates the contacting shoe pivotally secured at 13 to one end of the rocking lever 15, 16 the pivotal axis of the latter, 20 the contacting shoe pivotally secured at 19 to the rocking lever 15 and bearing against a member 52 rigid with a slider 53 slidingly engaging a slideway 54 parallel with the path followed by the slider 8. Lastly, 55 designates a rod connecting the slider 53 with the remote tool holder 6 submitted to the action of a return spring 23. The pivotal axis 16 of the rocking lever is fitted selectively in one of a plurality of perforations 56 provided longitudinally of the rocking lever and in one of a plurality of openings 57 formed in the stationary frame 17 so as to allow obtaining the desired pitch.

In Fig. 13, the cam 3 controls the longitudinal movements of the tool holder 6 as precedingly. This cam constrains as it revolves the slider 8 to execute a reciprocating movement in the slideway 9, the roller 10 providing for the contact between the slider 8 and the cam 3.

15 designates the rocking lever having its pivotal axis at 16 and provided with a number of perforations 40 which allow adjusting the transmission ratio as required by the pitch to be obtained in the cutting operation. In said Figure 13, the rocking lever 15 is pivotally secured at 58 to the end of the tool holder 6. A first shoe 12 pivotally secured at 13 to the end of the rocking lever 15 engages the bearing surface 11 of the slide 8. A second shoe 59 carrying the pivotal spindle 16 for the rocking lever 15 engages the bearing surface 60 on a member 61 rigid with the frame of the machine. The adjustment of the transmission ratio is operated as precedingly with the modifications to be disclosed hereinafter.

In the embodiment illustrated in Fig. 14, the same elements are again resorted to with the difference that the rocking lever 15 is pivotally secured no longer to the tool holder 6 but to the slider 8 at 62, said slider 8 carrying as precedingly the roller 10 in contact with the cam 3.

The pivotal axis 16 of the rocking lever 15 is, as in the case of Fig. 13, carried by a shoe 59 engaging a bearing surface 60 on a member 61 rigid with the frame of the machine.

At its upper end, the rocking lever 15 is pivotally secured at 19 to a second shoe 20 engaging the bearing surface 21 of a member 22 rigid with the tool holder 6.

The adjustment of the transmission ratio is again performed as precedingly with the modifications defined hereinafter.

In Figs. 13 and 14, the bearing surfaces 11 and 60 on one hand and 60 and 21 on the other, should always be parallel and the three pivotal points 13, 16 and 58 in the first case and 62, 16 and 19 in the second case should always be in accurate alignment. In said Figs. 13 and 14, the adjustment of the transmission ratio through the agency of the medial shoe 59 cuts out the necessity of a double locking of the pivot of the rocking lever both on the control lever and on the frame of the machine and it is possible to do away with the auxiliary locking means holding the control lever fast during the adjustment of the transmission ratio.

In Fig. 15, the arrangement is the same as in the case of Fig. 13 and two shoes are provided respectively at 12 for engagement against the bearing surface 11 of the slider 8 and at 59 for engagement against the bearing surface 60 of a member 61 rigid with the frame of the machine. The upper end of the rocking lever 15 is pivotally secured at 58 no longer as precedingly to the tool holder 6 but to the end of a rod 63 rigid with a slide valve 64 cooperating with a casing 65 rigid with the movable section 66 of a hydraulic jack the stationary piston 67 of which is rigidly secured to the saddle 7 of the machine. The movable section 66 of the jack is rigid with the tool carrier 6.

The rocking lever 15 controls, without exerting any substantial force, the movements of the slide valve 64 which allows, according to the position imparted to it, the driving fluid from the pipe 68 to enter the channels 69 and 70 selectively, said channels opening respectively in front of the opposite surfaces of the piston 67 of the hydraulic jack and this produces the longitudinal movements of the body 66 of said jack and consequently of the tool holder in either direction. The driving fluid returns through the return pipe 71 into its container feeding the pipe 68.

The rocking lever 15 which has to exert only a very slight force, as explained hereinabove, may be of a lighter structure and the rhythm of its operation may be increased with reference to the precedingly disclosed embodiments.

The location of the hydraulic jack is controlled by the location of the end of the rocking lever 15 and the sensitivity of this control may be increased upon amplification of the spacing between the tool holder 6 and the end of the rocking lever 15 before the latter acts on the slide valve 64.

Figure 16:
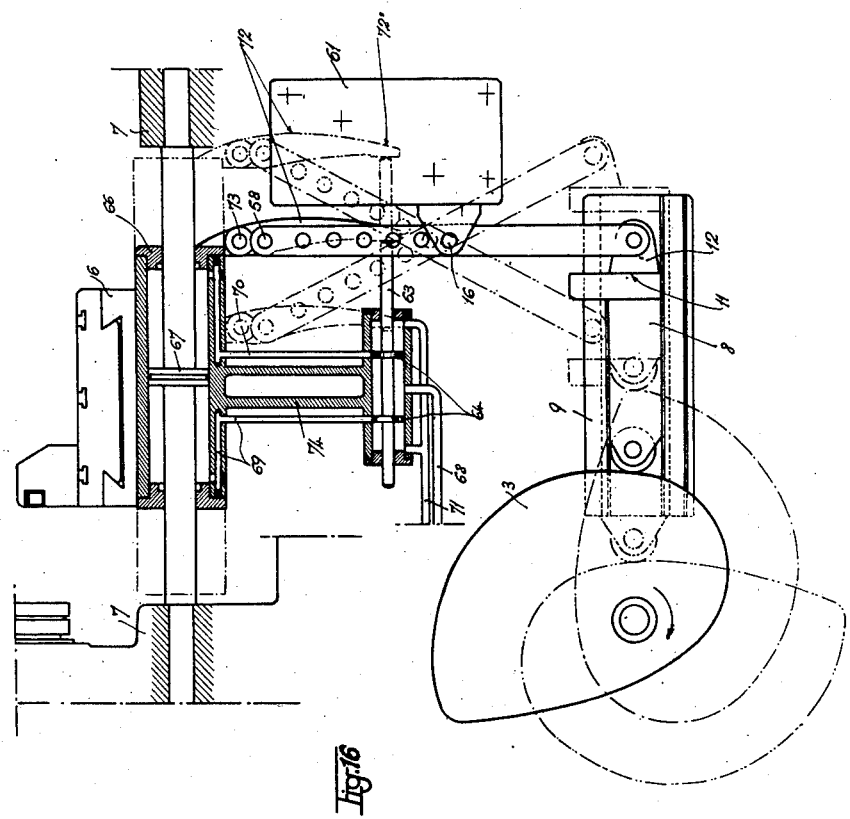
Fig. 16 is a modification of said auxiliary control.

To this end, and as illustrated in Fig. 16, it is possible to pivotally secure at 58 the end of the rocking lever 15 to a small lever 72 which is in its turn pivotally secured at 73 to the end of the body 66 of the hydraulic jack.

The free end 72' of this small lever controls the rod 63 of the slide valve 64 the casing 65 of which is, as precedingly, rigid with the body 6 of the hydraulic jack with the interposition, however, of an elongated connecting section 74.

It is readily apparent from inspection of said Fig. 16 that the spacing between the rocking lever and the jack is amplified by the magnification ratio provided by the lever 72 in the control of the slide valve 64 forming a pilot for the movements of the hydraulic jack-body 68 carrying the tool-holder 6.

Obviously, the shoes in the last described embodiments may be replaced by rollers.

What I claim is:

1. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, a pivot for said rocking lever, means for adjusting the location of said pivot with reference to said lever, two contacting members pivotally secured to the rocking lever along axes parallel with the pivotal axis of the lever said contracting members having contacting surfaces thereon, the three axes lying in a common plane and means operatively connecting the rocking lever with the elements, including means respectively disposed on the elements and having contacting surfaces respectively engaging the contacting surfaces on the contacting members, the ratio between the distances travelled by said slider element and said driven element assuming a predetermined value depending on the location of the pivot for the rocking lever.

2. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, a pivot for said rocking lever, means for adjusting the location of said pivot with reference to said lever, two contacting members pivotally secured to the rocking lever, along axes parallel with the pivotal axis of the lever, the three axes lying in a common plane, two parts cooperating through contacting surfaces with cooperating surfaces on the contacting members, said parts being rigid with the slider and the driven element respectively, the ratio between the distances travelled over by said slider and by said member rigid with the driven element assuming a predetermined value.

3. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, a pivot for said rocking lever, means for adjusting the location of said pivot with reference to said lever, two contacting members pivotally secured to the rocking lever along axes parallel with the pivotal axis of the lever, the three axes lying in a common plane, two parts cooperating through contacting surfaces with cooperating surfaces on the contacting members, one of said parts being rigid with the slider, the other part being independent of the slider and of the member rigid with the driven element, and means whereby the rocking lever is pivotally secured to the driven element through an axis lying in the plane of and parallel with the pivotal axis of the rocking lever and the pivotal axes of the two parts, the ratio between the distances travelled over by said slider and by said driven element assuming a predetermined value.

4. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, a pivot for said rocking lever, means for adjusting the location of said pivot with reference to said lever, two contacting members pivotally secured to the rocking lever along axes parallel with the pivotal axis of the lever, the three axes lying in a common plane, two parts cooperating through contacting surfaces with cooperating surfaces on the contacting members, one of said parts being rigid with the driven element, the other part being independent of the slider and of the member rigid with the driven element, and means whereby the rocking lever is pivotally secured to the slider through an axis lying in the plane of and parallel with the pivotal axis of the rocking lever and the pivotal axes of the two parts, the ratio between the distance travelled over by said slider and by said member rigid with the driven element assuming a predetermined value.

5. In a device for converting the movement of a cam to rectilinear movement of a driven element, means for controlling a the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, a pivot for said rocking lever, means for adjusting the location of said pivot with reference to said lever, two contacting members pivotally secured to the rocking lever, said contacting members having contacting surfaces thereon, along axes parallel with the pivotal axis of the lever, the three axes lying in a common plane, and means operatively connecting the rocking lever with the elements, including two parts respectively moving with said elements and having contacting surfaces respectively engaging the contacting surfaces on the contacting members, the contacting surfaces on the parts being parallel, at least one of said parts being rigid with the element with which it moves, the ratio between the distances travelled by said slider element and said driven element assuming a predetermined value, depending on the location of the pivot for the rocking lever.

6. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, a pivot for said rocking lever, means for adjusting the location of said pivot with reference to said lever, two contacting members pivotally secured to the rocking lever along axes parallel with the pivotal axis of the lever, said contacting members having contacting surfaces thereon, the three axes lying in a common plane, and means operatively connecting the rocking lever with the elements, comprising two parts respectively moving with said elements and having contacting surfaces respectively engaging the contacting surfaces on the contacting members, at least one of said parts being rigid with the element with which it moves and having the contacting surface thereon oblique with respect to direction of movement of the last-named element, the ratio between the distances traveled by the slider element and the driven element assuming a predetermined value, depending on the location of the pivot for the rocking lever.

7. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, a pivot for said rocking lever, means for adjusting the location of said pivot longitudinally of said lever, two contacting members pivotally secured to the rocking lever along axes parallel with the pivotal axis of the lever, the three axes lying in a common plane and means for operatively connecting the rocking lever with the elements, comprising two parts respectively moving with said elements, at least one of said parts being rigid with the element with which it moves, said parts having contacting surfaces respectively cooperating with the contacting surfaces on the contacting members, at least one of said contacting surfaces being curvilinear, the ratio between the distances travelled by the slider element and said driven element assuming a predetermined value depending on the location of the pivot for the rocking lever.

8. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a pivot for said rocking lever, means for adjusting the location of said pivot longitudinally of said lever, a stationary guide to an adjustable point of which the pivot is adapted to be secured, two contacting members pivotally secured to the rocking lever along axis parallel with the pivotal axis of the lever said contacting members having contacting surfaces thereon, the three axes lying in a common plane, and means for operatively connecting the rocking lever with said elements, comprising two parts respectively moving with said elements and having contacting surfaces respectively engaging the contacting surfaces on the contacting members, at least one of said parts being rigid with the element with which it moves, the ratio between the distances travelled by said slide element and said driven element depending on the location of the pivot for the rocking lever.

9. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, said rocking lever being provided longitudinally with a series of perforations, a pivot selectively engaging one of said perforations, means for securing said pivot to a stationary joint, two contacting members pivotally secured to the rocking lever along axes parallel with the pivotal axis of the lever said contacting members having contacting surfaces thereon, the three axes lying in a common plane, and means for operatively connecting the rocking lever with said elements, comprising two parts respectively moving with said elements and having contacting surfaces respectively engaging the contacting surfaces on the contacting members, at least one of said parts being rigid with the element with which it moves, the ratio between the distances travelled by the slider element and said driven element depending on the location of the pivot for the rocking lever.

10. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, two contacting members pivotally secured to the rocking lever, along axes parallel with the pivotal axis of the lever, the three axes lying in a common plane, two parts cooperating through contacting surfaces with cooperating surfaces on the contacting members, said parts being rigid with the slider element and with the driven element respectively, the ratio between the distances travelled over by said slider element and by said driven element assuming a predetermined value, a carrier adapted to slide longitudinally of the rocking lever, means for adjusting the carrier in a selected position with reference to the rocking lever, a pivot carried by said carrier perpendicularly to the plane in which the rocking lever is to rock, means for securing said pivot to a stationary point, a scale and cooperating reference marks carried by the cooperating edges of the rocking lever and of the carrier thereon, said scale defining the transmission ratio between the slider and the driven element.

11. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the cam, said driven element being adapted to move along a rectilinear path, a rocking lever, two contacting members pivotally secured to the rocking lever, along axes parallel with the pivotal axis of the lever, the three axes lying in a common plane, two parts provided with contacting surfaces engaging cooperating surfaces on the contacting members, said parts being rigid with the slider element and with the driven element respectively, the ratio between the distances travelled over by said slider element and by said driven element assuming an adjustable predetermined value, a carrier adapted to slide longitudinally of the rocking lever, means for adjusting the carrier in a selected position with reference to the rocking lever, a pivot carried by said carrier perpendicularly to the plane in which the rocking lever is to rock, means for securing said pivot to a stationary point, a scale and cooperating reference marks carried by the cooperating edges of the rocking lever and of the carrier thereon, said scale defining the transmission ratio between the slider element and the driven element, and means for locking the rocking lever to a stationary point during the sliding of the carrier thereon as required for adjusting said transmission ratio.

12. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the cam, said driven element being adapted to move along a rectilinear path, a rocking lever, two contacting members pivotally secured to the rocking lever, along axes parallel with the pivotal axis of the lever, the three axes lying in a common plane, two parts cooperating through contacting surfaces with cooperating surfaces on the contacting members, said parts being rigid with the slider element and with the driven element respectively, the ratio between the distances travelled over by said slider element and by said driven element assuming a predetermined value, a carrier adapted to slide longitudinally of the rocking lever, means for adjusting the carrier in a selected position with reference to the said rocking lever, a pivot carried by said carrier perpendicularly to the plane in which the rocking lever is to rock, means for securing said pivot to a stationary point, a scale and cooperating reference marks carried by the cooperating edges of the rocking lever and of the carrier thereon, said scale defining the transmission ratio between the slider element and the driven element, means for locking the rocking lever to a stationary point during the sliding of the carrier thereon as required for adjusting said transmission ratio and an eccentric arrangement associated with said locking means and adapted to accurately adjust the distance between said locking means engaging the rocking lever and the line along which the pivot moves with reference to said rocking lever.

13. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider element adapted to assume a rectilinear movement in a direction perpendicular to the axis of the cam and to which said roller is revolubly secured along an axis parallel with the axis of the cam, said driven element being adapted to move along a rectilinear path, a rocking lever, a pivot for said rocking lever, means for adjusting the location of said pivot with reference to said lever, two contacting members pivotally secured to the rocking lever, along axes parallel with the pivotal axis of the lever, the three axes lying in a common plane, two parts cooperating through contacting surfaces with cooperating surfaces on the contacting members, said parts being rigid with the slider element and with the driven element respectively, the ratio between the distances travelled over by said slider and by said driven element assuming a predetermined value, the pivotal axis of the rocking lever being located on the straight line connecting the pivotal connections between the two contacting members and the rocking lever beyond one of said pivotal connections.

14. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider member adapted to assume a rectilinear movement in a direction perpendicular to the axis of the cam and to which said roller is revolubly secured along an axis parallel with the axis of the cam, a member adapted to move in synchronism with said driven element, means for guiding said member along a rectilinear path, a rocking lever, a pivot for said rocking lever, means for adjusting the location of said pivot with reference to said lever, two contacting members pivotally secured to the rocking lever along axes parallel with the pivotal axis of the lever, the three axes lying in a common plane, two parts engaging through contacting surfaces cooperating surfaces on the contacting members, one of said parts at least being rigid with one of the above mentioned members to provide an operative connection between said element and the rocking lever, and means for operatively connecting the rocking lever with the other element through a point of the rocking lever in said common plane, the ratio between the distances travelled over by said slider and by said member moving in synchronism with the driven element assuming a predetermined value depending on the location of the pivot on the rocking lever.

15. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider member adapted to assume a rectilinear movement in a direction perpendicular to the axis of the cam and to which said roller is revolubly secured along an axis parallel with the axis of the cam, a slide valve member, a hydraulic system controlled by said slide valve and including a hydraulic jack adapted to control the longitudinal movements of the driven element and to make the latter move in synchronism with the slide valve rocking lever, a pivot for said rocking lever, means for adjusting the location of said pivot with reference to said lever, two contacting members pivotally secured to the rocking lever along axes parallel with the pivotal axis of the lever, the three axes lying in a common plane, two parts engaging through contacting surfaces cooperating surfaces on the contacting members, one of said parts at least being rigid with one of the above mentioned members to provide an operative connection between said members and the rocking lever and means for operatively connecting the rocking lever with the other members through a point of the rocking lever in said common plane, the ratio between the distances travelled over by said slider member and by said slide-valve member assuming a predetermined value depending on the location of the pivot on the rocking lever.

16. In a device for converting the movement of a cam to rectilinear movement of a driven element, means for controlling the movement of said driven element, comprising a rotary cam, means controlling the cam to make the latter assume a continuous rotary movement round its axis, a roller engaging said cam, a slider adapted to assume a rectilinear movement in a direction perpendicular to the axis of the cam and to which said roller is revolubly secured along an axis parallel with the axis of the cam, a slide valve, a hydraulic system controlled by said slide valve and including a hydraulic jack adapted to control the longitudinal movement of the driven element and to make the latter move in synchronism with the slide valve, a rocking lever, a pivot for said rocking lever, means for adjusting the location of said pivot with reference to said lever, two contacting members pivotally secured to the rocking lever along axes parallel with the direction of the pivotal axis of the lever, two parts engaging through contacting surfaces cooperating surfaces on the contacting members, one of said parts being rigid with the slider to provide an operative connection between said slider and the rocking lever, stationary means carrying the other part provided with a contacting surface, the pivotal axis of said other part registering with that of the rocking lever, an auxiliary lever controlling the slide valve and pivotally secured to the rocking lever along an axis parallel with the pivotal axes of the two parts, the different pivotal axes on the rocking lever lying in a common plane, means moving in synchronism with the driven element and to which the auxiliary lever is pivotally secured, the ratio between the distances travelled over by said slider and by said slide valve assuming a predetermined value depending on the location of the pivot on the rocking lever.

References Cited in the file of this patent

UNITED STATES PATENTS

| | | |
|---|---|---|
| 555,955 | Jennings | Mar. 10, 1896 |
| 1,502,467 | Glosh | July 22, 1924 |
| 2,347,372 | Silva | Apr. 25, 1944 |
| 2,621,522 | Miller | Dec. 16, 1952 |
| 2,677,281 | Gibson | May 4, 1954 |

FOREIGN PATENTS

| | | |
|---|---|---|
| 701,740 | Great Britain | Dec. 30, 1953 |